United States Patent [19]
Kim et al.

[11] Patent Number: 5,911,047
[45] Date of Patent: Jun. 8, 1999

[54] DATA TRAFFIC PROCESSING METHOD IN A SUBSCRIBER NETWORK ACCESS SUBSYSTEM OF ADVANCED COMMUNICATIONS PROCESSING SYSTEM

[75] Inventors: Kun-Suk Kim; Tae-Man Han; Pyung-Dong Cho, all of Daejeon, Rep. of Korea

[73] Assignees: Electronics and Telecommunications Research Institute, Daejeon; Korea Telecom, Seoul, both of Rep. of Korea

[21] Appl. No.: 08/903,794

[22] Filed: Jul. 31, 1997

[30] Foreign Application Priority Data

Nov. 29, 1996 [KR] Rep. of Korea ............. 96-59981

[51] Int. Cl.$^6$ .................................. G06F 9/00
[52] U.S. Cl. .................................. 395/200.52
[58] Field of Search .................. 364/DIG. 1 MS, 364/DIG. 2 MS; 395/200.3, 200.38, 200.39, 200.4, 200.41, 200.52, 652, 284

[56] References Cited

U.S. PATENT DOCUMENTS

4,335,426  6/1982  Maxwell et al. ............ 395/200.52
4,354,229  10/1982  Davis et al. ............ 395/284
5,761,429  6/1998  Thompson ............ 395/200.54

*Primary Examiner*—Robert B. Harrell
*Attorney, Agent, or Firm*—Jacobson, Price, Holman & Stern, PLLC

[57] ABSTRACT

A data traffic processing method in a subscriber network access subsystem of an advanced communications processing system is disclosed including an operation process of a data processing master module and an operation process of a data processing slave module. The operation process of the data processing master module includes the steps of: initializing hardware, displaying a system logo on a screen and initializing all parameters; initializing the data processing master module; and initializing a slave and informing a service processing board assembly (SPA) that a master execution preparation has been ended. The operation process of the data processing slave module includes the steps of: initializing the hardware and displaying the system logo on the screen; initializing the data processing slave module; and informing a master that the slave is an alive state and initializing a protocol parameter.

10 Claims, 10 Drawing Sheets

| TASK | INPUT SIGNAL | | OUTPUT SIGNAL | |
|---|---|---|---|---|
| | TRANSMITTING SIDE | SIGNAL | TRANSMITTING SIDE | SIGNAL |
| SPA DATA TRANSMITTING TASK 31 | SPA | SIGNALS RELATING TO COMMAND CONTROL TASK; DPA BOARD INITIALIZATION REQUEST SIGNAL PAD COMMAND INPUT MODE SIGNAL STANDBY TIME SETTING RECEIVING BUFFER RESETTING SIGNAL, TRANSMITTING QUEUE RESETTING SIGNAL, CHIP OPERATION CHECK SIGNAL NIA HARDWARE RESETTING SIGNAL, PM REQUEST SIGNAL, SIGNALS RELATING TO CHANNEL TRANSMISSION TASK; DATA TRANSMISSION SIGNAL, TRANSFER RATE CORRECTING SIGNAL, X3 PROTOCOL PARAMETER CORRECTING SIGNAL, LOCAL LOOPBACK MODE CONVERTING SIGNAL, LOCAL LOOPBACK MODE RELEASE SIGNAL, | SLAVE | DPA BOARD INITIALIZATION REQUEST SIGNAL PAD COMMAND INPUT MODE SIGNAL STANDBY TIME SETTING RECEIVING BUFFER RESETTING SIGNAL, TRANSMITTING QUEUE RESETTING SIGNAL, DUMMY COMMAND SIGNAL NIA HARDWARE RESETTING SIGNAL, PM REQUEST SIGNAL, SIGNALS RELATING TO CHANNEL TRANSMISSION TASK; TRANSFER RATE CORRECTING SIGNAL, X3 PROTOCOL PARAMETER CORRECTING SIGNAL, LOCAL LOOPBACK MODE CONVERTING SIGNAL, LOCAL LOOPBACK MODE RELEASE SIGNAL, NIA CHANNEL RESETTING |
| | | | SPA | CHIP OPERATION CONFIRM SIGNAL |
| | | | PERFORMANCE MONITOR TASK | TASK GENERATION |
| PERFORMANCE MONITOR TASK 32 | SPA DATA TRANS- MITTING TASK | PM REQUEST SIGNAL, | SPA | PM REPORT SIGNAL |
| SLAVE DATA TRANS- MISSION TASK 33 | SLAVE | SIGNALS RELATING TO COMMAND CONTROL TASK DPA BOARD INITIALIZATION REQUEST SIGNAL DPA LOAD REPORT SIGNAL, PAD RECALL CHARACTER REPORT SIGNAL, DCD STATUS REPORT SIGNAL, CHIP OPERATION REPORT SIGNAL, SIGNAL RELATING TO CHANNEL TRANSMISSION SIGNAL, DATA TRANSMISSION SIGNAL, INTERRUPT PACKET TRANSMISSION SIGNAL, RESET PACKET STOP SIGNAL, INTERRUPT PACKET STOP SIGNAL, | | |
| NIA CHECK TASK 34 | | | SLAVE | NIA OPERATION CHECK SIGNAL |
| SLAVE ALIVE CHECK TASK 35 | | | SLAVE | SLAVE BOARD OPERATION CHECK SIGNAL |

FIG. 4

| TASK | INPUT SIGNAL | | OUTPUT SIGNAL | |
| --- | --- | --- | --- | --- |
| | TRANSMITTING SIDE | SIGNAL | RECEIVING SIDE | SIGNAL |
| CHANNEL RECEIVING TASK 41 | N/A | | MASTER | DATA TRANSMISSION SIGNAL |
| CHANNEL TRANSMITTING TASK 42 | MASTER | DATA TRANSMISSION SIGNAL, X3 PROTOCOL PARAMETER CORRECTING SIGNAL, TRANSFER RATE CORRECTING SIGNAL, LOCAL LOOPBACK MODE CONVERTING SIGNAL, LOCAL LOOPBACK MODE RELEASE SIGNAL, | N/A   MAILBOX | MAILBOX POST |
| | N/A   MAILBOX | MAILBOX | | |
| COMMAND CONTROL TASK 43 | MASTER | DPA BOARD INITIALIZATION REQUEST SIGNAL, PAD COMMAND INPUT MODE SIGNAL, STANDBY TIME SETTING SIGNAL, RECEIVING BUFFER RESETTING SIGNAL, TRANSMITTING QUEUE RESETTING SIGNAL, CHIP OPERATION CHECK SIGNAL, NIA HARDWARE CHECK SIGNAL, PM REQUEST SIGNAL, | MASTER | CHIP OPERATION CONFIRM SIGNAL |
| | | | | RETURN MEMORY BLOCK |
| | N/A   MAILBOX | MAILBOX | N/A   MAILBOX | MAILBOX POST |
| | SERVICE MEMORY PART | RECEIVING MEMORY BLOCK | SERVICE END QUEUE | QUEUE POST |
| PERFORMANCE MONITOR TASK 44 | COMMAND CONTROL TASK | PM REQUEST SIGNAL | | |
| DCD CHECK TASK 45 | N/A   MAILBOX | MAILBOX | N/A   MAILBOX | MAILBOX POST |
| | | | MASTER | DCD STATUS REPORT SIGNAL |
| DCD CHECK TASK 46 | N/A   MAILBOX | MAILBOX | N/A   MAILBOX | MAILBOX POST |
| | SERVICE MEMORY PART | RETURN MEMORY BLOCK | | |
| | SERVICE END QUEUE | QUEUE | | |
| FLOW CONTROL TASK 47 | N/A   MAILBOX | MAILBOX | N/A   MAILBOX | MAILBOX POST |

DATA TRAFFIC PROCESSING METHOD IN A SUBSCRIBER NETWORK ACCESS SUBSYSTEM OF ADVANCED COMMUNICATIONS PROCESSING SYSTEM

BACKGROUND OF THE INVENTION

The present invention relates to a data traffic processing method in a subscriber network access subsystem (SNAS) of an advanced communications processing system (ACPS).

A communications processing system (CPS) is a gateway device for easily obtaining necessary information by interlinking a public switched telephone network (PSTN) with a packet switched data network (PSDN) to connect an information user to an information provider.

Recently, the importance of data communications is being on increase in comparison with voice communications. However, since the information provider is contained in the PSDN and the information user belongs to the PSTN, it is difficult to communicate therebetween, and important information may be not used.

SUMMARY OF THE INVENTION

It is an object of the present invention to provide a data traffic processing method in a subscriber network of an advanced communications processing system (ACPS) for processing a data traffic when transmitting user information connected to a subscriber network to a network component such as an information provider and an operation administration and maintenance (OAM) system and when transmitting information received from the network component to the user, carrying out an X.3 packet assembler/disassembler (PAD) processing function and a traffic flow control function, and transmitting information about a subscriber channel status, data processing board assembly (DPA) performance and failure etc. to the OAM system through a service processing board assembly (SPA).

In accordance with one aspect of the present invention, a data traffic processing method in a subscriber network access subsystem of an advanced communications processing system includes an operation process of a data processing master module and an operation process of a data processing slave module. The operation process of the data processing master module includes the steps of: initializing hardware during system booting, displaying a system logo on a screen and initializing all parameters; initializing the data processing master module to carry out a communication function with a service processing board assembly (SPA), a communication function with a salve, a network interface assembly (NIA) check function and a slave check function; and initializing the slave and informing the SPA that a master execution preparation has been ended. The operation process of the data processing slave module includes the steps of: initializing the hardware during the system booting and displaying the system logo on the screen; initializing the data processing slave module to carry out a communication function with the NIA, a communication function with a master, an NIA control function and a channel transmission function; and informing the master that the slave is an alive state and initializing a protocol parameter to get ready for services.

BRIEF DESCRIPTION OF THE ATTACHED DRAWINGS

FIG. 3 illustrates a description of tasks and signals relating to a master module of a DPA (data processing board assembly) according to the present invention;

DETAILED DESCRIPTION OF PREFERRED EMBODIMENT

Figure 1:
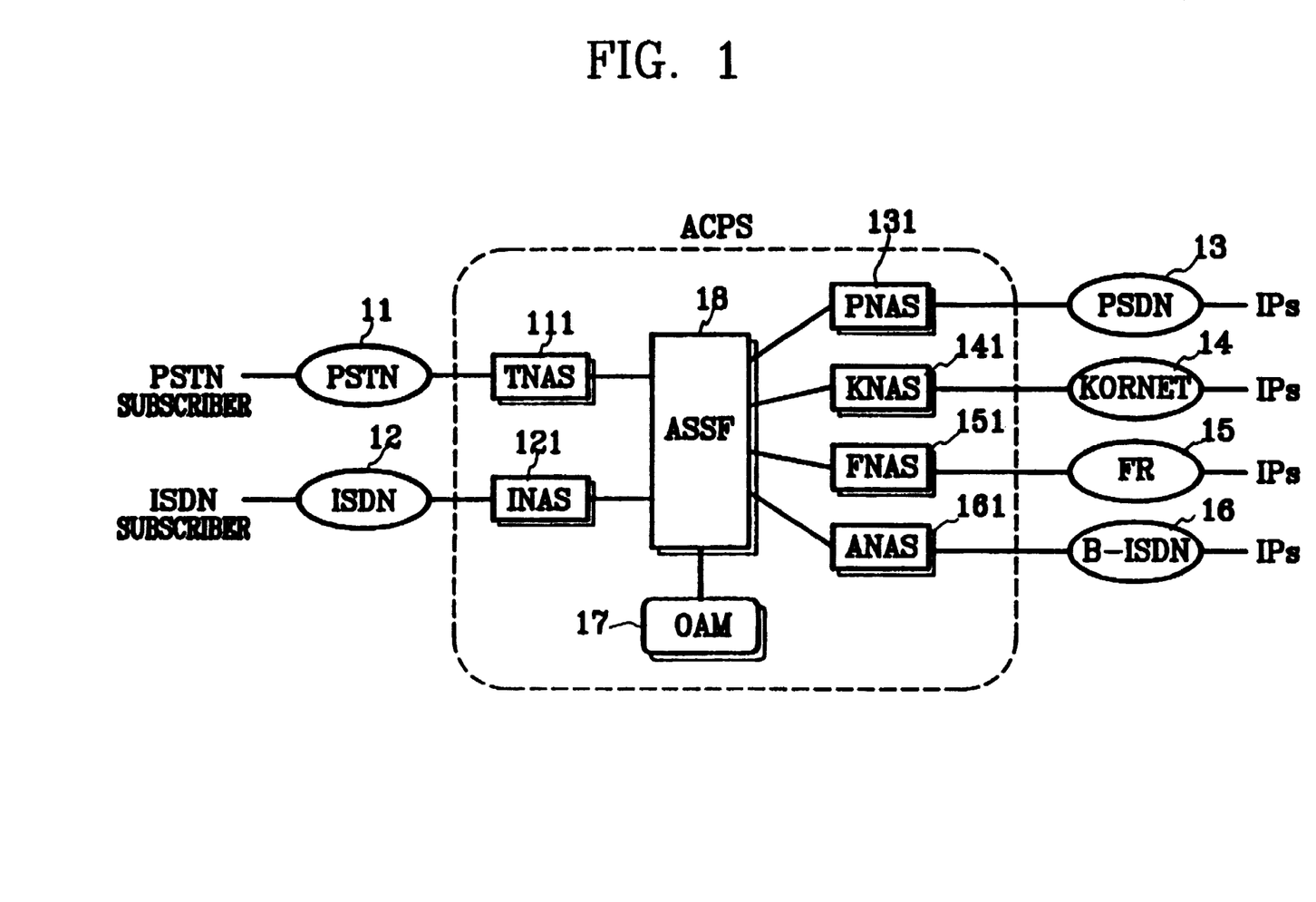
FIG. 1 is a block diagram of an advanced communications processing system (ACPS) applied to the present invention.

Referring to FIG. 1, an advanced communications processing system (ACPS) of an open type has a different structure from a conventional communications processing system and requires a general network connection interface function because it should accommodate a variety of public networks, such as a public switched telephone network (PSTN) 11, an integrated services digital network (ISDN) 12, a packet switched data network (PSDN) 13, an internet 14, a frame relay (FR) network 15, an asynchronous transfer mode (ATM) network 16, etc. To provide service working between the various networks, the advanced communications processing system (ACPS) should have a structure which is easy to be enlarged and shortened. A network working range is broadly divided into a subscriber side and an information provider side. As networks interlinked with the subscriber side, there are the PSTN 11 and the ISDN 12. As networks interlinked with the information provider side, there are the PSDN 13, the internet 14, the frame relay network 15 and the ATM network 16.

A high speed switching fabric (HSSF) subsystem 18 connects various network access modules constituting the ACPS, a service supporting module and a communications processing module to one another at high speed, and provides a function of an internal high speed interworking network which is in charge of the transportation of service traffic. As network access devices interlinked with the subscriber side, there are a telephony network access subsystem (TNAS) 111 and an ISDN network access subsystem (INAS) 121. As network access devices interlinked with the information provider side, there are a packet network access subsystem (PNAS) 131, a KORNET access subsystem (KNAS) 141, a frame relay network access subsystem (FNAS) 151 and an ATM network access subsystem (ANAS) 161.

Figure 2:
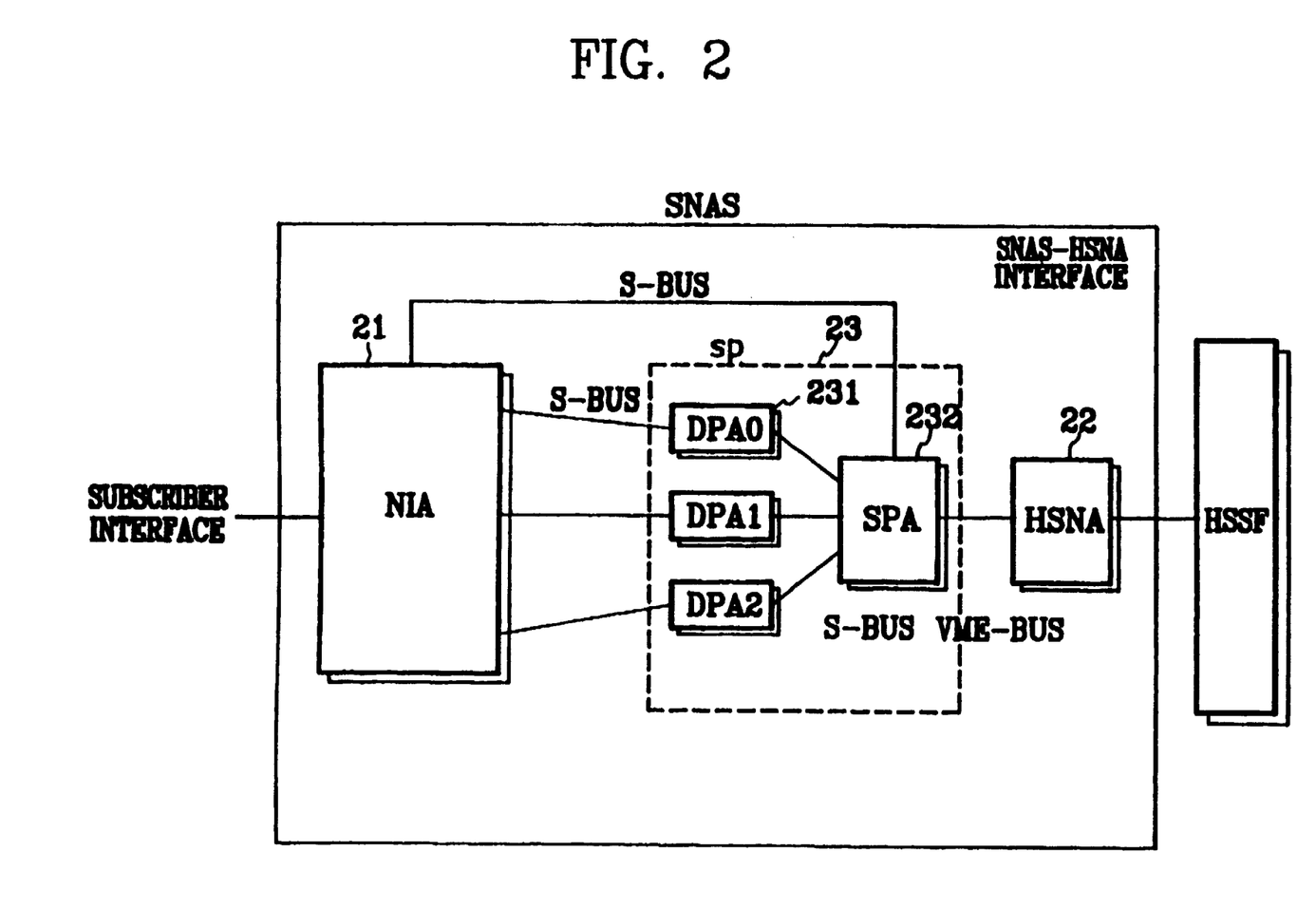
FIG. 2 is a block diagram of a subscriber network access subsystem (SNAS) applied to the present invention.

FIG. 2 illustrates a subscriber network access subsystem (SNAS) for supplying various communication services of the ACPS to the user connected to a subscriber network. The SNAS includes a network interface assembly (NIA) module 21 for interfacing with the subscriber network, a high speed network adaptor (HSNA) module 22 for interfacing with the HSSF subsystem 18, and a service processing (SP) module 23 for controlling the NIA module 21 and the HSNA module 22 and processing services.

The service processing module 23 includes a data processing board assembly (DPA) 231 for processing functions such as the discrimination of a subscriber MODEM speed, the detection of a MODEM error, the transmission/reception of subscriber information, initialization, self diagnosis etc., and a service processing board assembly (SPA) 232 for processing services and taking charge of control.

The SPA 232 uses a communication processor of a dedicated IPC (InterProcessor Communication) for data communication with the DPA 231, and transmits data through a common memory of 1M bytes by an interrupt method. The IPC processor communicates with 3 DPAs through an S bus (serial communication bus). The DPA 231 consists of one main or master and a plurality of salves according to the kind of the network access device. The main of the DPA 231 transmits and receives data by serial communication between the slave and the SPA 232 and monitors the NIA 21 through an alarm port. An application program implemented in the DPA 231 is broadly classified into master and slave modules. The master module connects communication between the slave and the SPA 232, while the slave module transmits data received from the subscriber through a network interface module to the SPA 232 or transmits data received from the SPA 232 to the subscriber through the master. Moreover, the slave module processes a PAD (packet assembler/disassembler) and monitors a subscriber channel.

FIG. 3 illustrates a description of tasks and signals relating to the master module of the DPA.

An SPA data transmission task 31 receives two kinds of signals from the SPA 232. As signals to be transmitted to a command control task of the slave module, there are a DPA board initialization request signal, a PAD command input mode signal, a standby time setting signal used for XON/XOFF flow control, a receiving buffer resetting signal, a transmitting queue resetting signal, a chip operation check signal, an NIA hardware resetting signal, a DPA board load check signal, etc. As signals to be transmitted to a channel transmission task of the slave module, there are a channel data transmission signal, a transfer rate correcting signal, an X.3 protocol parameter correcting signal, a channel local loopback mode converting signal, a channel local loopback mode release signal, etc.

If the DPA board load check signal is received, the SPA data transmission task 31 generates a performance monitor task 32 to inform the SPA 232 of the load state of the master periodically. A slave data transmission task 33 receives two kinds of signals from the slave. As signals to be received from the command control task of the slave module, there are a DPA initialization confirm signal, a DPA load report signal, a PAD recall character report signal, a DCD (or CD; carrier detect) status report signal, a chip operation report signal, etc. As signals to be received from the channel transmission task of the slave module, there are a channel data transmission signal, an interrupt packet transmission signal, a reset packet transmission signal, an interrupt packet stop signal, etc. A network interface assembly (NIA) check task 34 checks whether the NIA operates or not, and a slave alive check task 35 checks whether a slave board operates or not.

Figure 4:
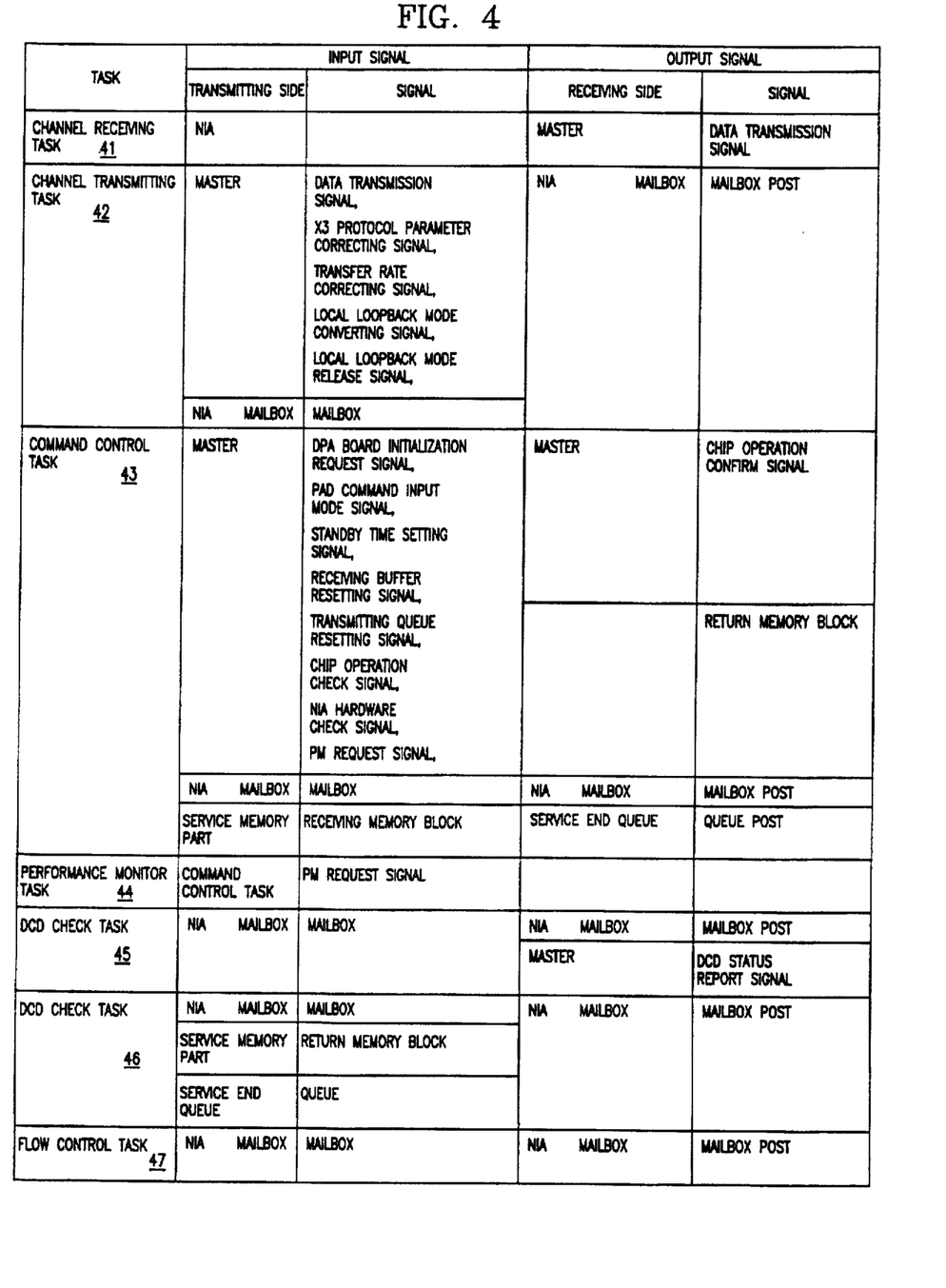
FIG. 4 illustrates a description of tasks and signals relating to a slave module of a DPA (data processing board assembly) according to the present invention.

FIG. 4 illustrates a description of tasks and signals relating to the slave module of the DPA.

A channel receiving task 41 transmits data received from the NIA 21 to the master module by using a data transmission signal. A channel transmitting task 42 processes the channel data transmission signal, the X.3 protocol parameter correcting signal, the transfer rate correcting signal, the channel local loopback mode converting signal and the channel local loopback release signal received from the master module. The channel transmitting task 42 transmits data to the subscriber by using an NIA mail box of the channel.

A command control task 43 receives, from the master, the DPA board initialization request signal, the PAD command input mode signal, the standby time setting signal used for XON/XOFF flow control, the channel release request signal, the receiving buffer resetting signal, the transmitting queue resetting signal, the chip operation check signal, the NIA hardware resetting signal, the slave board operation check signal and the DPA board load check signal. The command control task 43 processes the signals received from the master by using the NIA mail box, a memory division identifier (ID), a service end queue, etc., and generates a performance monitor task 44 to inform the master of the load state of the salve periodically. A DCD check task 45 informs the master of the state of the DCD by using the NIA mail box. A service end processing task 46 processes tasks relating to the service end of the channel subscriber. A flow control check task 47 controls a flow during the data transmission of each channel.

Figure 5:
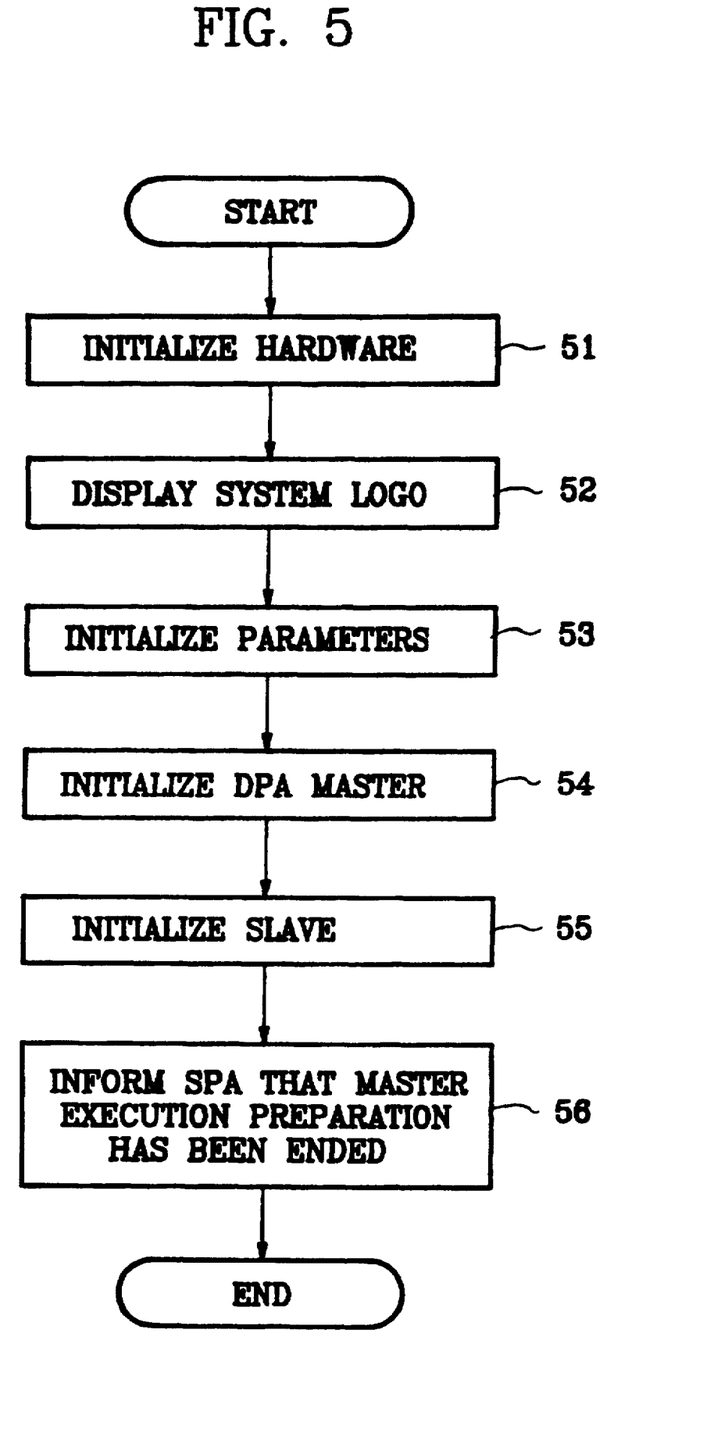
FIG. 5 is a flow chart showing a procedure of a service operation of a DPA master module according to the present invention.

FIG. 5 is a flow chart showing a procedure of a service operation of the DPA master module. The DPA master module generates tasks and system resources for supporting communication between the SPA 232 and the DPA 231 of the SNAS and processes various services.

The DPA master module initializes hardware during system booting (step 51). A system logo is displayed on a console screen (step 52). All parameters are initialized (step 53). The DPA master is initialized (step 54). During the initialization of the DPA master, a communication function with the SPA, a communication function with the slave, an NIA check function and a slave check function supported by the master module are performed. If the initialization of the DPA master is completed, the slave is initialized (step 55). The DPA master module informs the SPA 232 that a master executing preparation has been ended (step 56).

Figure 6:
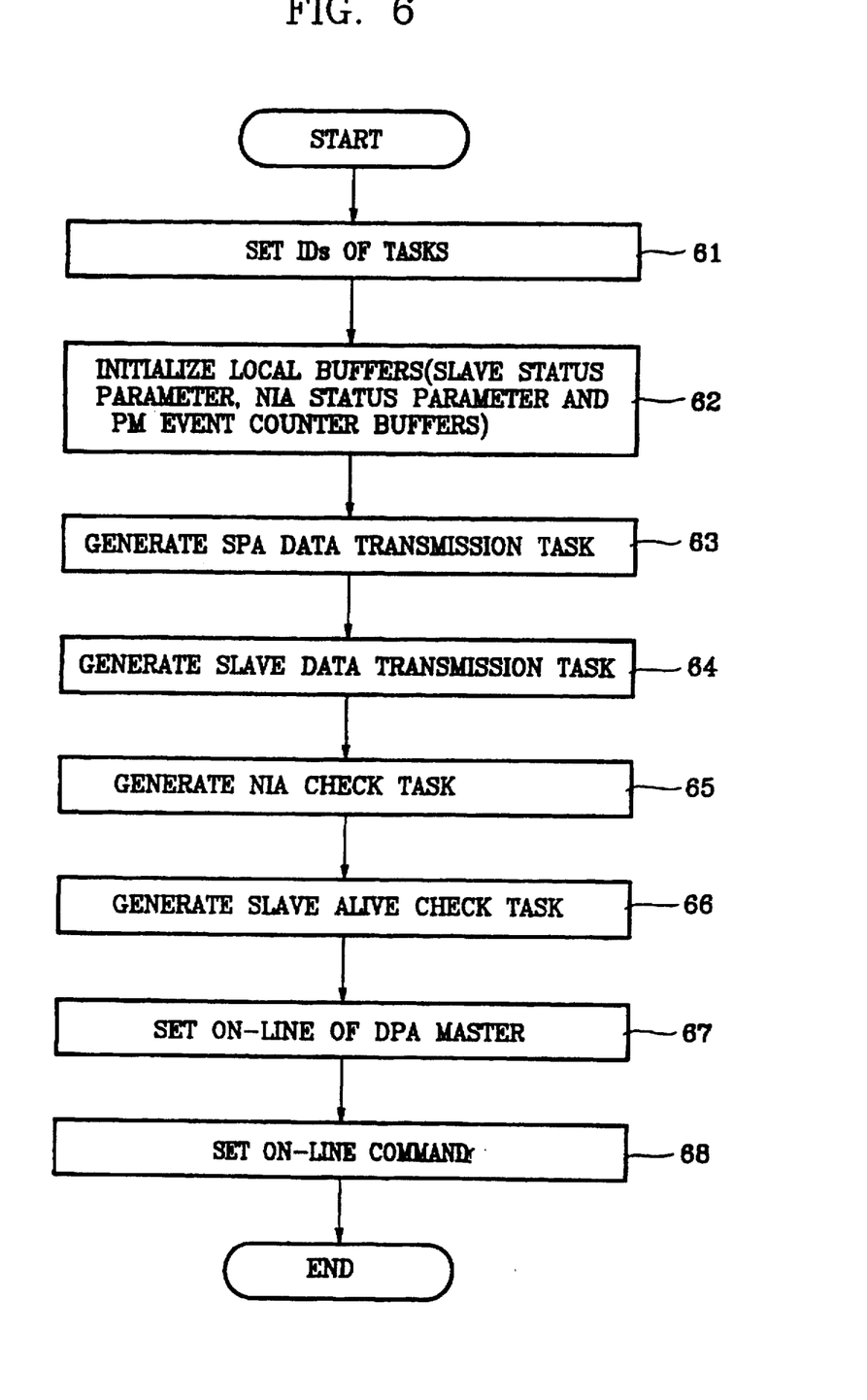
FIG. 6 is a flow chart showing a procedure of an initialization operation of a DPA master module according to the present invention.

FIG. 6 is a flow chart of the initialization operation of the DPA master module and shows a detailed procedure of the initialization operation of the DPA master module executed at step 54 of FIG. 5. IDs of tasks implemented in the master module are set (step 61). Local buffers such as slave status parameter, NIA status parameter and periodic management (PM) event counter buffers are initialized (step 62). An SPA data transmission task for communicating with the SPA is generated (step 63), and a slave data transmission task for communicating with the slave is generated (step 64). An NIA check task for checking whether the NIA operates is generated (step 65) and a slave alive check task for checking whether the slave operates is generated (step 66). An on-line command for controlling the DPA master is set (step 67). A prompt of the DPA master is generated (step 68).

Figure 7:
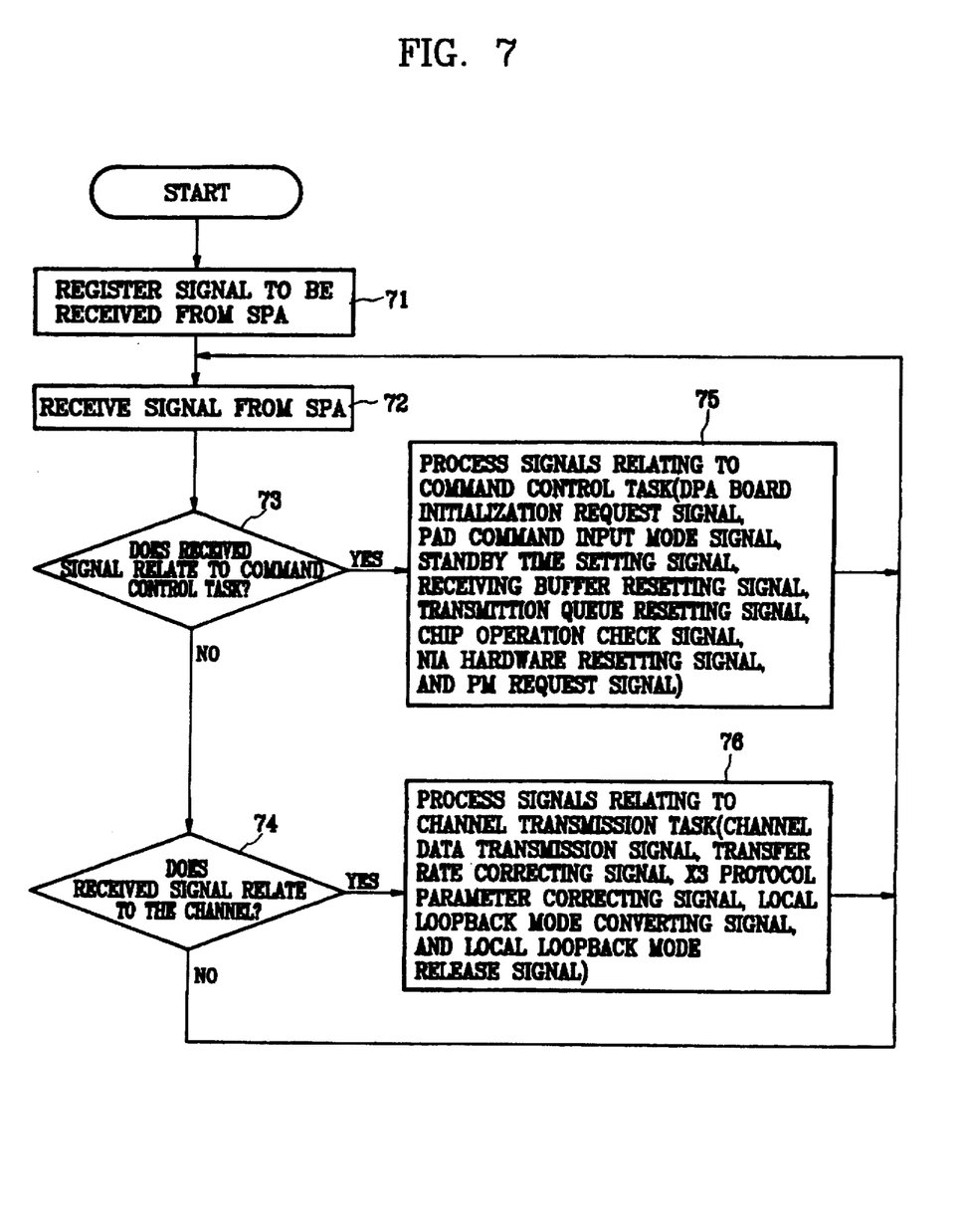
FIG. 7 is a flow chart showing a procedure of a service processing board assembly (SPA) data transmission task operation according to the present invention.

FIG. 7 is a flow chart of a SPA data transmission task operation and shows a detailed procedure of the SPA data transmission task generating process executed at step 63 of FIG. 6. The SPA data transmission task 31 processes signals relating to the command control task and the channel transmission task received from the SPA 232.

A signal to be received from the SPA 232 is registered in a kernel of real time operating system (RTOS) (step 71). The SPA data transmission task 31 receives a signal from the SPA 232 (step 72), and checks whether the received signal relates to the command control task (step 73). If the received signal relates to the command control task, signals relating to the command control task are processed (step 75). As the signals relating to the command control task, there are the DPA board initialization request signal, PAD command input mode signal, standby time setting signal used for XON/XOFF flow control, receiving buffer resetting signal, transmitting queue resetting signal, chip operation check signal, NIA hardware resetting signal and DPA board load check signal.

If the received signal is not the signal relating to the command control task, whether it relates to the channel transmission task is checked (step 74). If so, signals relating thereto are processed. As the signals relating to the channel transmission task, there are the channel data transmission signal, transfer rate correcting signal, X.3 protocol parameter correcting signal, channel local loopback mode converting signal and channel local loopback mode release signal. If the received signal is not the channel transmission task, step 74 returns to step 72 to repeat the above processes each time a new signal is received.

Figure 8:
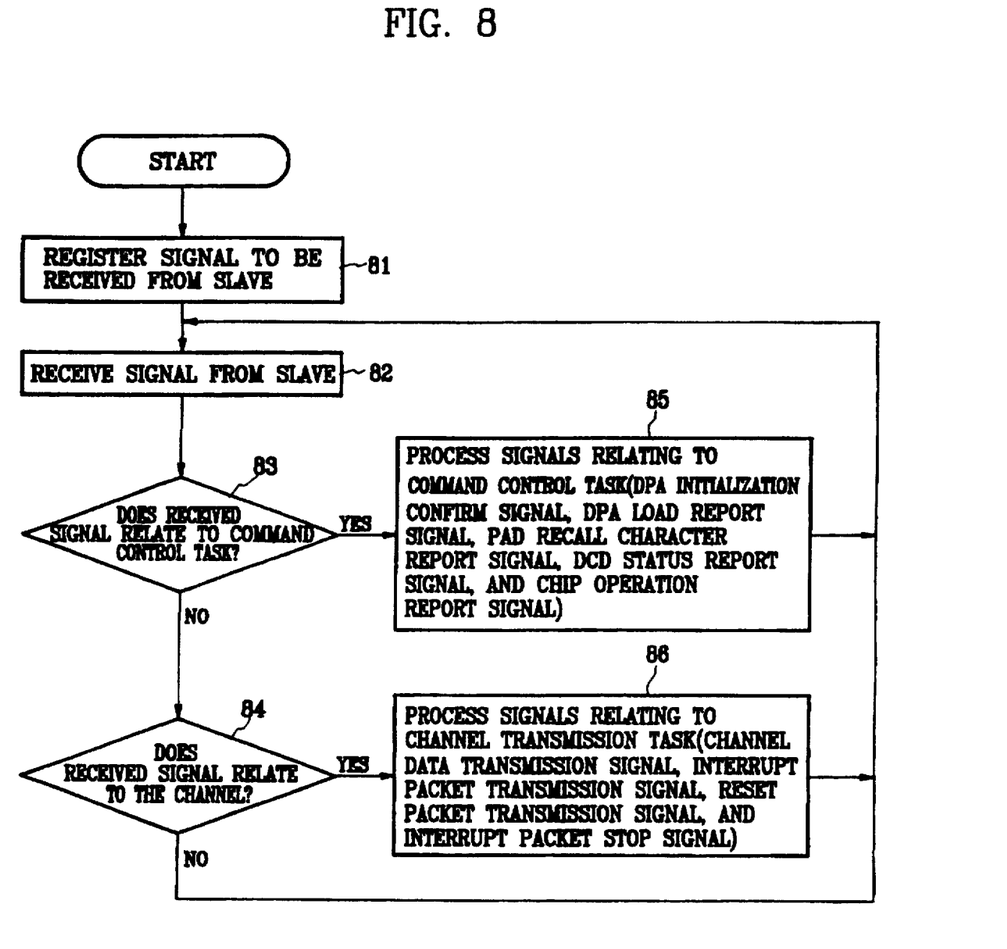
FIG. 8 is a flow chart showing a procedure of a slave data transmission task operation according to the present invention.

FIG. 8 is a flow chart of a slave data transmission task operation and shows a detailed procedure of the slave data transmission task generating process executed at step 64 of FIG. 6. The slave data transmission task 33 processes the command control task and the channel transmission task received from the slave.

A signal to be received from the slave is registered in the kernel of the real time operating system (RTOS) (step 81). The slave data transmission task 33 receives a signal from the slave (step 82), and checks whether the received signal relates to the command control task (step 83). If the received signal relates to the command control task, signals relating to the command control task are processed (step 85). As the signals relating to the command control task, there are the DPA initialization confirm signal, DPA load report signal, PAD recall character report signal, DCD status report signal and chip operation report signal.

If the received signal is not the signal relating to the command control task, whether the received signal relates to the channel transmission task is checked (step 84). If so, signals relating thereto are processed (step 86). As the signals relating to the channel transmission task, there are the channel data transmission signal, interrupt packet transmission signal, reset packet transmission signal and interrupt packet stop signal. If the received signal is not the channel transmission task, step 84 returns to step 82 to repeat the above processes each time a new signal is received.

Figure 9:
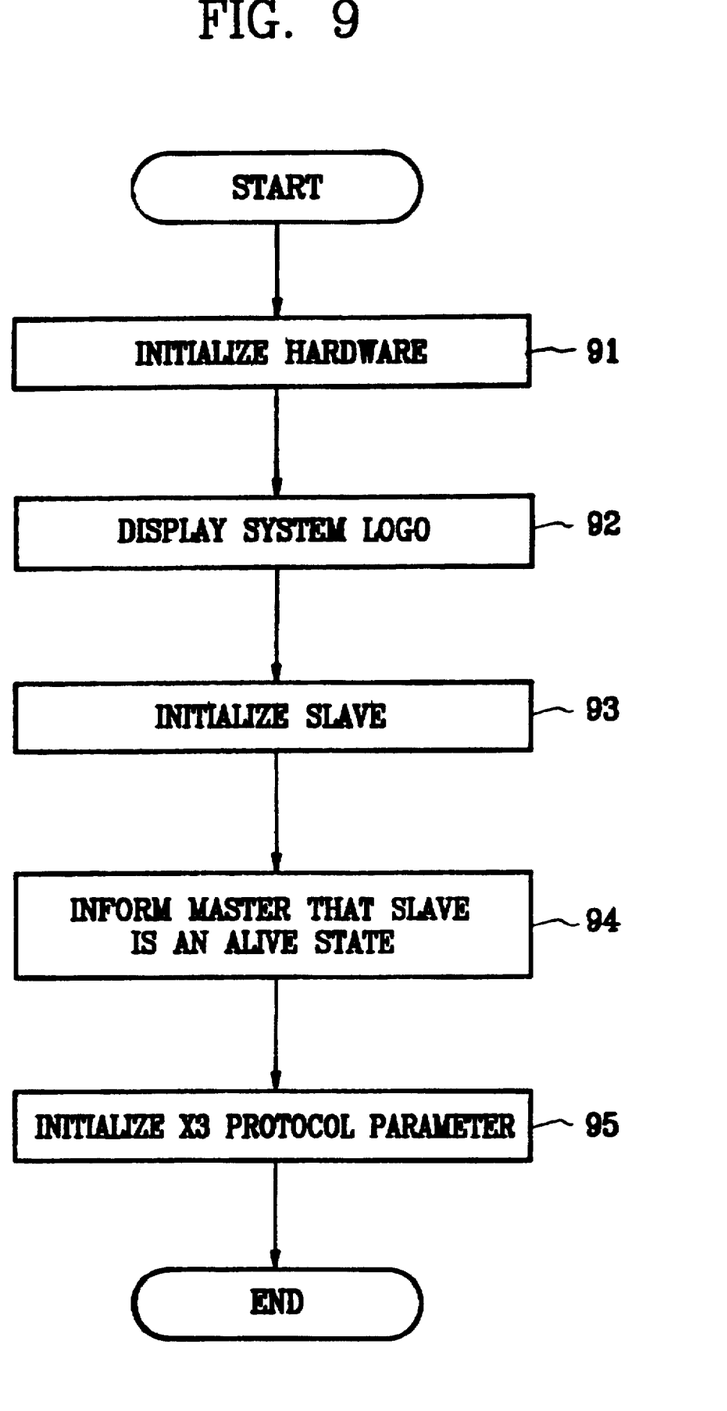
FIG. 9 is a flow chart showing a procedure of a service operation of a DPA slave module according to the present invention.

FIG. 9 is a flow chart showing a procedure of a service operation of the DPA slave module. The DPA slave module generates tasks and system resources for supporting communication between the NIA 21 and the DPA 231 of the SNAS and processes various services.

The DPA slave module initializes the hardware during system booting (step 91). The system logo is displayed on the console screen (step 92). The DPA slave is initialized (step 93). During the initialization of the DPA slave, a communication function with the NIA 21, a communication function with the master, an NIA control function and a channel transmission function supported by the slave module are performed. The DPA slave module informs the master that the slave is an alive state (step 94). An X3 protocol parameter is initialized to get ready for services (step 95).

Figure 10:
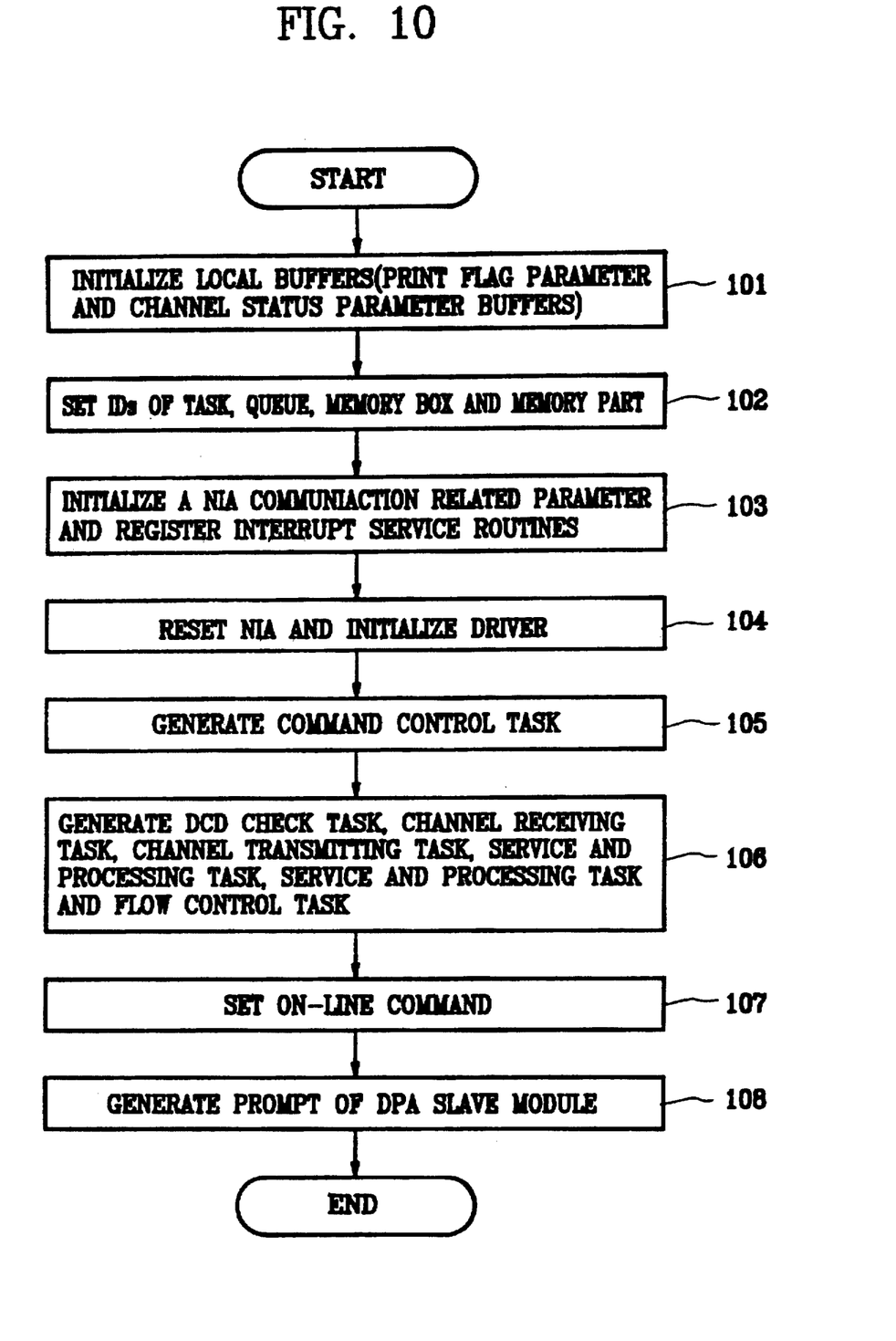
FIG. 10 is a flow chart showing a procedure of an initialization operation of a DPA slave module according to the present invention.

FIG. 10 is a flow chart of the initialization operation of the DPA slave module and shows a detailed procedure of the initialization operation of the DPA slave module implemented at step 93 of FIG. 9. Local buffers such as print flag parameter and channel status parameter buffers are initialized (step 101). IDs of a task carried out in the slave module, a queue, a memory box and a memory part are set (step 102). An NIA communication related parameter for communicating with the NIA 21 is initialized and interrupt service routines such as an NIA transmitting function, an NIA receiving function and an NIA error processing function are registered (step 103). The NIA is reset and a driver is initialized to be able to communicate with the NIA (step 104). The command control task for processing a command signal from the slave is generated (step 105). Tasks for performing a DCD check function, a channel receiving function, a channel transmitting function, a service end processing function and a flow control function are generated (step 106). An on-line command for controlling the DPA slave is set (step 107). Finally, a prompt of the DPA slave is generated (step 108).

As described above, since there are provided the construction of resources such as the task carried out in the DPA of the SNAS, the mail box and the queue for communication between tasks, and the operation procedure of various functions, the information provider can easily transmits useful information to the user through the communications processing system and information society can be activated.

While there is shown and described the preferred embodiment of the invention, it will be understood by those skilled in the art that various changes in form and details may be made without departing from the spirit and scope of the invention as defined by appended claims.

What is claimed is:

1. A data traffic processing method in a subscriber network access subsystem of an advanced communications processing system, comprising the steps of:

an operation process of a data processing master module comprising the steps of;
(a) initializing hardware during system booting, displaying a system logo on a screen and initializing all parameters,
(b) initializing the data processing master module to carry out a communication function with a service processing board assembly (SPA), a communication function with a slave, a network interface assembly (NIA) check function and a slave check function, and
(c) initializing the slave and informing the service processing board assembly (SPA) that a master execution preparation has been ended; and an operation process of a data processing slave module comprising the steps of;
(d) initializing the hardware during the system booting and displaying the system logo on the screen,
(e) initializing the data processing slave module to carry out a communication function with a network interface assembly (NIA), a communication function with a master, a network interface assembly (NIA) control function and a channel transmission function, and
(f) informing the master that the slave is an alive state and initializing a protocol parameter to get ready for services.

2. A data traffic processing method as claimed in claim 1, wherein said step (b) comprises the steps of:
(g) setting identifications of tasks carried out in the master module and initializing local buffers;

(h) generating a service processing board assembly (SPA) data transmission task for communicating with the service processing board assembly (SPA), generating a slave data transmission task for communicating with the slave, generating a network interface assembly (NIA) check task for checking whether the network interface assembly (NIA) operates and generating a slave alive check task for checking whether the slave operates; and (i) setting an on-line command for controlling the data processing master module and generating a prompt of the data processing master module.

3. A data traffic processing method as claimed in claim 2, wherein said step (h) of generating a slave data transmission task comprises the steps of:

registering a signal to be received from the slave in a kernel of real time operating system;

receiving a signal from the slave and checking the received signal;

if the received signal relates to a command control task, processing signals relating to the command control task and returning to said step of receiving a signal;

if the received signal relates to a channel transmission task, processing signals relating to the channel transmission task and returning to said step of receiving a signal; and if the received signal neither the command control task nor the channel transmission task, returning to said step of receiving a signal.

4. A data traffic processing method as claimed in claim 3, wherein said step of processing signals relating to the command control task processes a data processing board assembly (DPA) initialization confirm signal, a data processing board assembly (DPA) load report signal, a packet assembler/disassembler (PAD) recall character report signal, a carrier detect status report signal and a chip operation report signal.

5. A data traffic processing method as claimed in claim 4, wherein said step of processing signals relating to the channel transmission task processes a channel data transmission signal, an interrupt packet transmission signal, a reset packet transmission signal and an interrupt packet stop signal.

6. A data traffic processing method as claimed in claim 2, wherein said step (h) of generating a service processing board assembly (SPA) data transmission task comprises the steps of:

registering a signal to be received from the service processing board assembly (SPA) in a kernel of real time operating system;

receiving a signal from the service processing board assembly (SPA) and checking the received signal;

if the received signal relates to a command control task, processing signals relating to the command control task and returning to said step of receiving a signal;

if the received signal relates to a channel transmission task, processing signals relating to the channel transmission task and returning to said step of receiving a signal; and if the received signal neither the command control task nor the channel transmission task, returning to said step of receiving a signal.

7. A data traffic processing method as claimed in claim 6, wherein said step of processing signals relating to the command control task processes a data processing board assembly (DPA) initialization request signal, a PAD (packet assembler/disassembler) command input mode signal, a standby time setting signal used for flow control, a receiving buffer resetting signal, a transmitting queue resetting signal, a chip operation check signal, a network interface assembly module (NIA) hardware resetting signal and a load check signal on a data processing board assembly (DPA).

8. A data traffic processing method as claimed in claim 6, wherein said step of processing signals relating to the channel transmission task processes a channel data transmission signal, a transfer rate correcting signal, an X.3 protocol parameter correcting signal, a channel local loopback mode converting signal and a channel local loopback mode release signal.

9. A data traffic processing method as claimed in claim 2, wherein said local buffers of said step (g) includes slave status parameter, network interface assembly (NIA) status parameter and periodic management event counter buffers.

10. A data traffic processing method as claimed in claim 1, wherein said step (e) comprises:

initializing local buffers such as print flag parameter and channel status parameter buffers and setting identifications of a task carried out in the slave module, a queue, a memory box and a memory part;

initializing a network interface assembly (NIA) communication related parameter, registering interrupt service routines such as a network interface assembly (NIA) transmitting function, a network interface assembly (NIA) receiving function and a network interface assembly (NIA) error processing function, resetting the network interface assembly (NIA) and initializing a driver;

generating a command control task for processing a command signal from the master and generating a carrier detect check task, a channel receiving task, a channel transmitting task, a service end processing task and a flow control task; and setting an on-line command for controlling the data processing slave module and generating a prompt of the data processing slave module.

\* \* \* \* \*